US006669166B2

United States Patent
Enomoto et al.

(10) Patent No.: US 6,669,166 B2
(45) Date of Patent: Dec. 30, 2003

(54) ELECTROMAGNETIC VALVE

(75) Inventors: Shigeiku Enomoto, Hoi-gun (JP); Yutaka Miyamoto, Nukata-gun (JP); Yukihiro Shinohara, Kariya (JP); Michihiro Oshima, Chita-gun (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 151 days.

(21) Appl. No.: 09/903,773

(22) Filed: Jul. 13, 2001

(65) Prior Publication Data

US 2001/0048091 A1 Dec. 6, 2001

(30) Foreign Application Priority Data

| Jul. 28, 2000 | (JP) | 2000-228846 |
| Jul. 31, 2000 | (JP) | 2000-230505 |
| Mar. 29, 2001 | (JP) | 2001-096008 |

(51) Int. Cl.$^7$ .............................................. F16K 31/02
(52) U.S. Cl. ................................. 251/129.15; 417/273
(58) Field of Search ..................... 251/129.07, 129.15; 417/269, 273, 505

(56) References Cited

U.S. PATENT DOCUMENTS

| 4,875,658 A | * | 10/1989 | Asai ....................... 251/129.21 |
| 5,285,969 A |   | 2/1994  | Greiner et al. |
| 5,639,066 A | * | 6/1997  | Lambert et al. ............ 251/282 |
| 5,762,318 A |   | 6/1998  | Staib et al. |
| 6,202,699 B1 |  | 3/2001  | Meyer et al. |
| 6,310,530 B1 |  | 10/2001 | Jacobus |

FOREIGN PATENT DOCUMENTS

| DE | 3937523 A1 | 5/1991 |
| DE | 9017109.8 | 5/1992 |
| DE | 4206210 A1 | 9/1993 |
| DE | 4221757 A1 | 1/1994 |
| DE | 4423103 A1 | 1/1996 |
| DE | 4425843 A1 | 1/1996 |
| DE | 29610850 U1 | 10/1996 |
| DE | 19810330 A1 | 9/1999 |
| DE | 19933329 C1 | 6/2000 |
| EP | 0 964 150 | 12/1999 |
| JP | 2000-35149 | 2/2000 |
| JP | 2000-120905 | 4/2000 |

* cited by examiner

Primary Examiner—Edward K. Look
Assistant Examiner—John K Fristoe, Jr.
(74) Attorney, Agent, or Firm—Nixon & Vanderhye P.C.

(57) ABSTRACT

In an electromagnetic valve, a composite valve case has a cylindrical hollow and a composite valve body formed in spool shape is slidably housed in the cylindrical hollow. The composite valve body has not only an inherent valve function for changing fluid path area according to its movement in the cylindrical hollow but also an armature function for constituting a magnetic circuit. The composite valve case has not only a cylinder function for allowing the valve body to slidably move but also a stator function for constituting a magnetic circuit. The composite valve body and the composite valve case are made of soft magnetic material and are provided at their surfaces with thin hardened layers formed by surface or heat treatment.

16 Claims, 14 Drawing Sheets

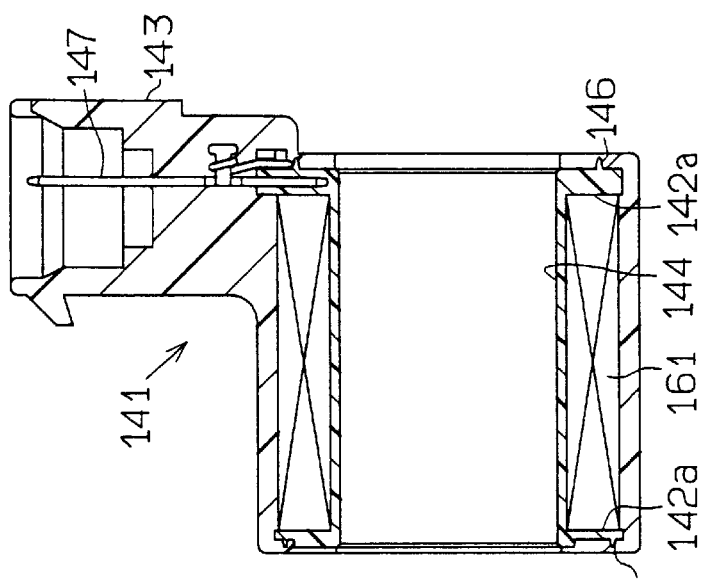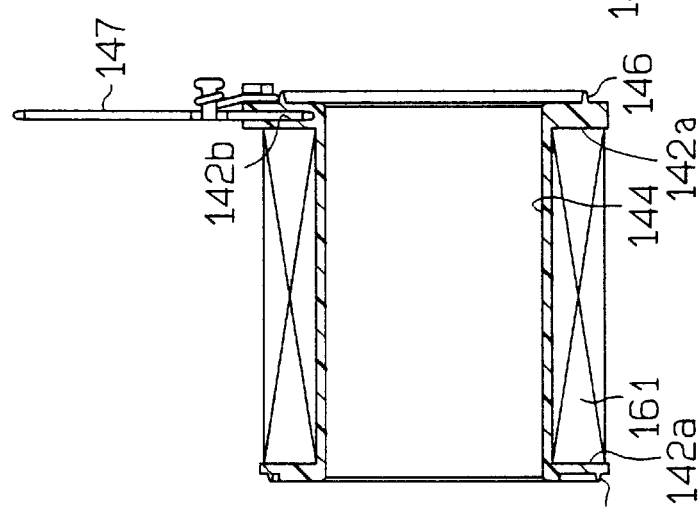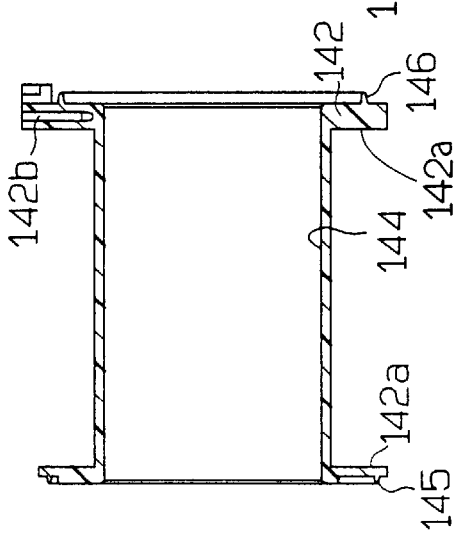

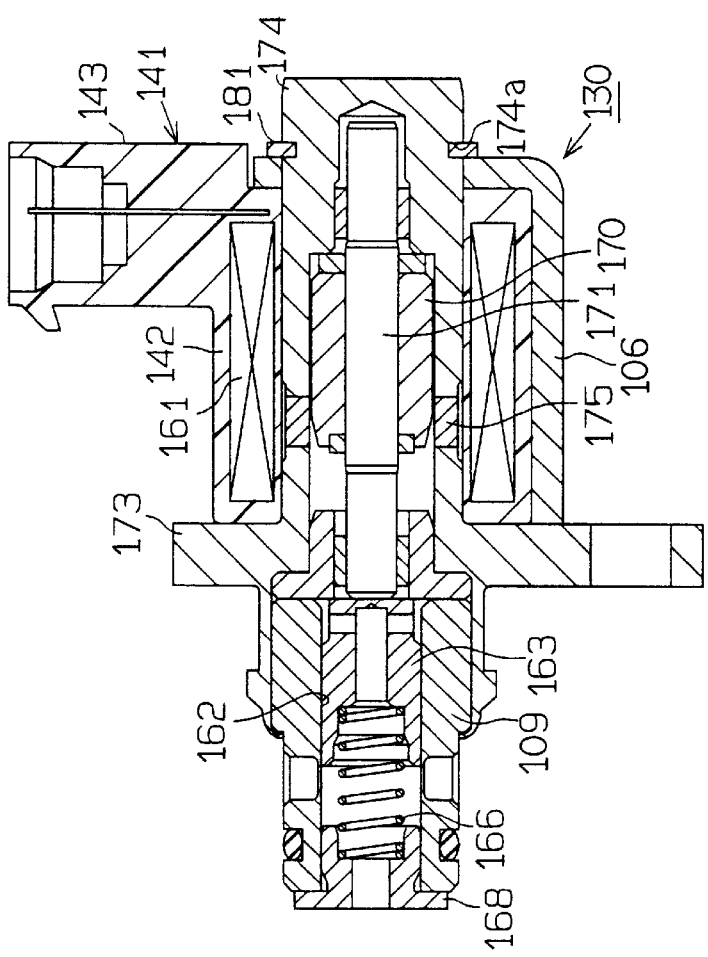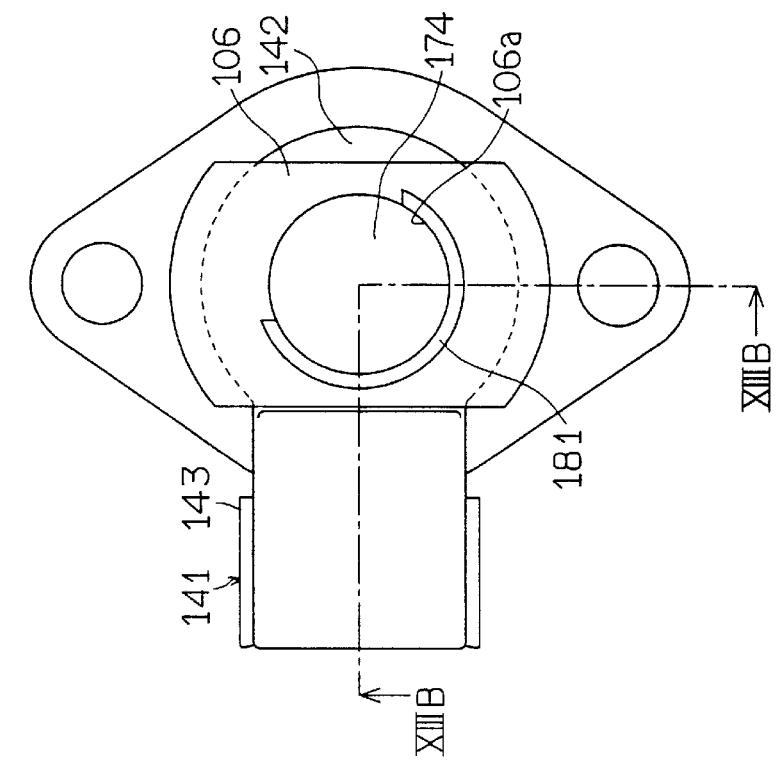

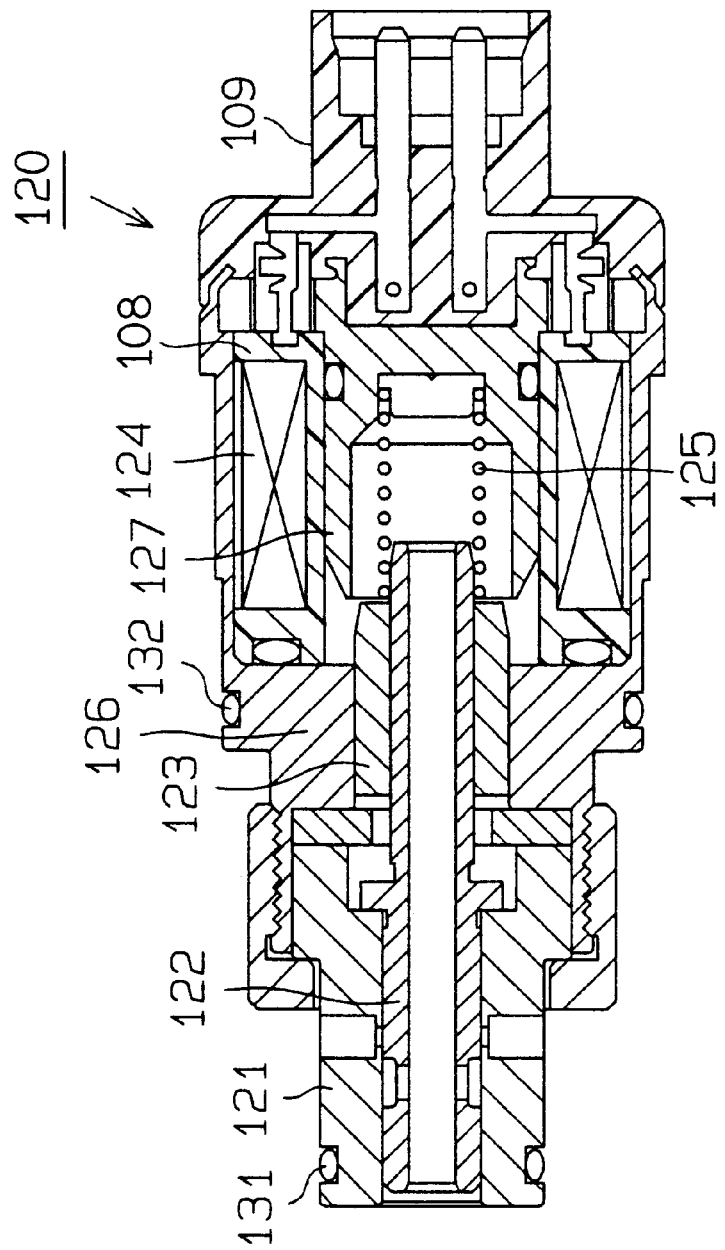

ated on Jul. 28, 2000, No. 2000-230505 filed on Jul. 31,
ELECTROMAGNETIC VALVE

CROSS REFERENCE TO RELATED APPLICATION

This application is based upon and claims the benefit of priority of Japanese Patent Applications No. 2000-228846 filed on Jul. 28, 2000, No. 2000-230505 filed on Jul. 31, 2000 and No.2001-96008 filed on Mar. 29, 2001, the contents of which are incorporated herein by reference.

BACKGROUND OF THE INVENTION

1. Field of the Invention

The present invention relates to an electromagnetic valve for controlling fluid flow amount, typically, applicable to a variable discharge high pressure pump for diesel engines so as to adjust fuel amount discharged from the pump.

2. Description of the Prior Art

JP-A-11-336638 discloses an electromagnetic valve 120 shown in FIG. 14, which is applied to a variable discharge high pressure pump for a diesel engine.

In the electromagnetic valve 120 shown in FIG. 14, a valve body 122 is slidably housed in a valve case so as to change a flow path area. An end of the valve body 122 on right side in FIG. 14 is press fitted to an armature 123. When a coil 124 is energized, the valve body 122 and the armature 123 move in a valve opening direction (in right direction in FIG. 14) against a biasing force of a spring 125. Further, the electromagnetic valve 120 has a first stator (housing) 126 and a second stator 127. According to the electromagnetic valve 120 mentioned above, a displacement position (lift amount) of the valve body 122 is controlled by an amount of current to be applied to the coil 124 so that the flow path area, through which fluid flows, is regulated.

The armature 123, which constitutes a part of a magnetic circuit, is made of soft magnetic material such as pure iron. It is necessary to process the valve body 122 made of high speed steel SKH 51 with quenching and tempering treatments for improving wear resistance and reducing frictional force. Conventionally, the armature 123 and the valve body 122 are formed in advance as separate parts and, then, integrated into one body by press fitting from standpoints that the quenching treatment adversely affects on magnetic characteristic of the armature 123 made of soft magnetic material and that required functions of the armature 123 and the valve body 122 are inherently different.

Further, the first stator 126, which constitutes a part of a magnetic circuit similar as the armature 123, is made of soft magnetic material such as electromagnetic stainless steel. It is necessary to process the valve case 121, which is made of, for example, chromemolybdenum steel SCM 15, with carbonized hardening treatment (hardening depth is about 0.5 mm) for improving wear resistance and reducing frictional force similarly as the valve body 122. The first stator 126 and the valve case 121 are formed as separate parts since the carbonized hardening treatment adversely affects on magnetic characteristic of the first stator 126 and required functions of the valve case 121 and the first stator 126 are inherently different.

As mentioned above, the conventional electromagnetic valve 120 has a lot of parts whose functions are different so that the manufacturing cost is higher.

Furthermore, the coil 124 is accommodated in a resin bobbin 108. The electromagnetic valve 120 is provided at an end thereof with a resin connector 109. Electric signals are input to and output from the electromagnetic valve 120 via the resin connector 109.

Recently, it is highly demanded in view of protecting earth environment, preserving resources and promoting recycling to separate a resin member such as the bobbin 108 from a metal member such as the first and second stators 126 and 127 when the car incorporating the electromagnetic valve 120 is scraped. However, as the first and second stators 126 and 127 surround the resin bobbin 108, it is troublesome and requires complicated works to dismount the bobbin 108 out of the electromagnetic valve 120.

SUMMARY OF THE INVENTION

To solve the problems mentioned above, it is an object of the present invention to provide a compact electromagnetic valve having a less number of components in which at least one of the components has a plurality of functions selected from valve case, valve body, armature and stator functions.

To achieve the above object, in the electromagnetic valve to be fixed to a base housing for controlling fluid flow in housing fluid passages provided in the base housing, a case member having a stator and a valve case is provided inside with a cylindrical hollow extending from the valve case to the stator. A coil member arranged around the case member on a side of the stator, and a cylindrical moving member having an armature and a valve body is housed in the cylindrical hollow so that the valve body is in slidable contact with the valve case for controlling the fluid flow. The valve body is moved axially when the coil member is energized to generate magnetic flux passing through the stator and the armature.

With the electromagnetic valve mentioned above, the case member has a feature that the valve case and at least a part of the stator are integrally formed into one body to constitute a composite valve case and/or the cylindrical moving member has a feature that the valve body and the armature are integrally formed into one body to constitute a composite valve body.

It is preferable to have a construction that, when the cylindrical moving member moves in the cylindrical follow relatively to the case member, an amount of the fluid flowing through inner fluid passages provided in the case member and the moving member is changed.

Preferably, the composite valve case and/or the composite valve body is made of soft magnetic material for assuring better magnetic characteristics and is provided at a surface thereof with a hardened layer formed by a surface treatment or a heat treatment for improving wear resistance and reducing frictional force. It is preferable that the hardened layer is provided at least at one of a surface of the composite valve case and a surface of the composite valve body which are in sliding contact with each other. It is preferable that the hardened layer is a layer, whose depth is several μm, formed by soft nitride heat treatment.

Preferably, the stator is composed of a first stator, a magnetic flux restricting element and a second stator which are arranged in series in an axial direction of the case member so that the magnetic flux mainly passes from the first stator via the armature to the second stator, while bypassing the magnetic flux restricting element.

Further, it is preferable that the magnetic flux restricting element is a thin wall portion of the case member whose wall thickness is thinner than that of any of the first and second stators through which magnetic flux passes. The thin wall portion has, preferably, a tapered outer surface whose diameter is smaller toward the armature for improving magnetic characteristics.

It is another object of the present invention to provide an electromagnetic valve in which a coil member is easily separated from a valve case member constituted by a stator and valve case.

To achieve the another object, the case member is provided outside with a flange surface extending outward perpendicularly to an axis thereof. A coil member, which is arranged around the case member on a side of the stator, is urged toward and fixed to the flange surface by a detachable fixing member such as a bolt or clip.

It is preferable that the coil member is composed of a solenoid having a center hole into which the case member on a side of the stator is inserted and a housing disposed outside the solenoid. With this construction, the solenoid and the housing are urged toward and fixed to the flange surface or the base housing by the detachable fixing member in a state that the solenoid is sandwiched between the flange surface and the housing. This construction is preferable on classically collecting or recycling waste material.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIGS. 12A to 12C are views showing steps of manufacturing a solenoid of the electromagnetic valve of FIG. 10;

FIG. 13A is a side view of a modified electromagnetic valve according to the fifth embodiment;

FIG. 13B is a cross sectional view taken along a XIII—XIII line of FIG. 13A; and FIG. 14 is a cross sectional view of a conventional electromagnetic valve as a prior art.

DESCRIPTION OF THE PREFERRED EMBODIMENTS (First Embodiment)

An electromagnetic valve according to a first embodiment of the present invention, which is applied to a variable discharge high pressure pump of a common rail fuel injection device for a diesel engine, is described with reference to FIGS. 1 to 4. The variable discharge high pressure pump serves to intake low pressure fuel from a fuel tank and, after pressurizing the low pressure fuel, discharge pressurized fuel to a common rail. The common rail accumulates fuel with predetermined high pressure corresponding to fuel injection pressure. The variable discharge high pressure pump is a three line system delivery pump having three pressure chambers arranged at angular intervals of 120° in which fuel discharge amount to each line system is regulated by the electromagnetic valve disposed at an intake fluid passage of the pump for controlling fuel flow amount. An operation of the electromagnetic valve is controlled by a known electric control unit (ECU) so as to regulate the discharge amount of the variable discharge high pressure pump so that fuel pressure in the common rail is controlled to an optimum value.

Figure 1:
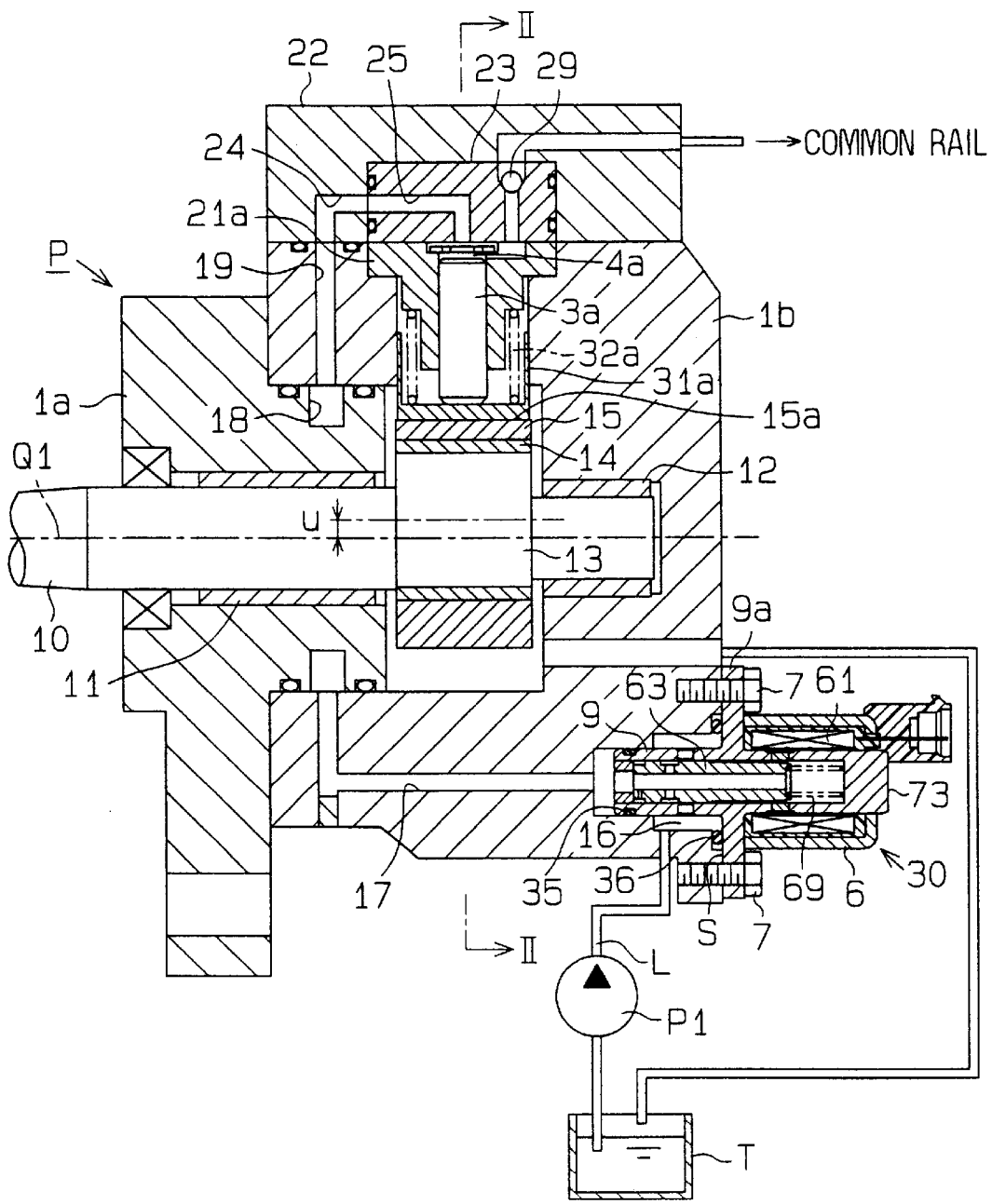
FIG. 1 is a cross sectional view of a variable discharge high pressure pump to which an electromagnetic valve according to a first embodiment is applied.

In a variable discharge high pressure pump P as shown in FIG. 1, a drive shaft 10 is rotatably held by sleeve bearings (friction bearings) 11 and 12 disposed in pump housings 1a and 1b, respectively. The drive shaft 10 is driven to rotate in synchronism with 4/3 rotation of an engine, in a case that the engine has four cylinders. The drive shaft 10 has an eccentric portion 13 whose centerline is shifted from an axial line Q1 thereof by a distance $\mu$. The eccentric portion 13 is in rotatable contact with an eccentric cam 15 via a sleeve bearing 14 (friction bearing).

Figure 2:
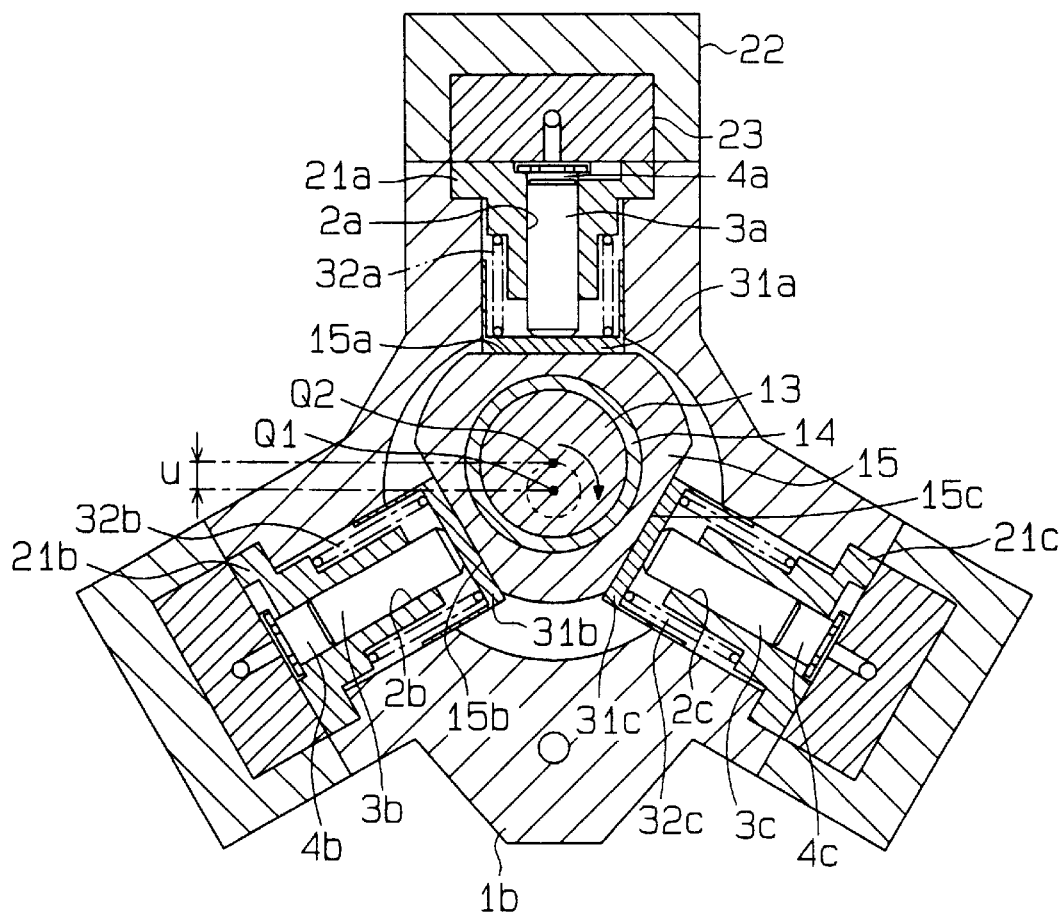
FIG. 2 is a cross sectional view taken along a line II—II of FIG. 1.

As shown in FIG. 2, the eccentric cam 15 is provided at an outer circumferential surface thereof with three flat surfaces 15a, 15b and 15c. Cylinder bodies 21a, 21b and 21c, which have cylinders 2a, 2b and 2c, respectively, are disposed outside the three flat surfaces 15a, 15b and 15c. Plungers 3a, 3b and 3c are slidably housed in the cylinders 2a, 2b and 2c to constitute pressure chambers 4a, 4b and 4c between ends thereof and inner circumferential walls of the cylinders 2a to 2c, respectively. The rotation of the eccentric portion 13 following rotation of the drive shaft 10 causes a center Q2 of the eccentric cam 15 to rotate about the center Q1 of the drive shaft 10 along a circular path (as indicated by a broken line in FIG. 2) whose radius is $\mu$, thereby causing the flat surfaces 15a to 15b of the eccentric cam 15 to move in directions away from and near to the center Q1 of the drive shaft 10 so that the plungers 3a to 3c make reciprocating motion within the cylinders 2a to 2c. Accordingly, the fuel within the pressure chambers 4a to 4c is pressurized in sequence.

Referring to FIG. 1, an electromagnetic valve 30 is fastened and fixed by bolts 7 to a lower end of the pump housing 1b. A fuel sump 16 is provided around the electromagnetic valve 30. The electromagnetic valve 30 is a linear solenoid valve having a coil 61. A lift amount of a composite valve body 63, that is, largeness of a fuel path area, is decided according to an amount of current to be applied to the coil 61, as described later in detail.

Fuel in the fuel tank T is pressurized to about 1.5 Mpa by a feed pump P1 and fed to the fuel sump 16 via a low pressure fluid passage L. When the electromagnetic valve 30 is operated to open the valve, low pressure fuel flows from the fuel sump 16 to a low pressure fluid passage 17. The low pressure fluid passage 17 communicates via a ring shaped low pressure fluid passage 18 provided in the pump housing 1a with a low pressure fluid passage 19 provided in the pump housing 1b and, then, communicates via fluid passages 24 and 25 with the pressure chamber 4a disposed above the plunger 3a. Further, the low pressure fluid passage 17 communicates via other low pressure fluid passages (not shown) with the pressure chamber 4b or 4c, too.

Figure 3:
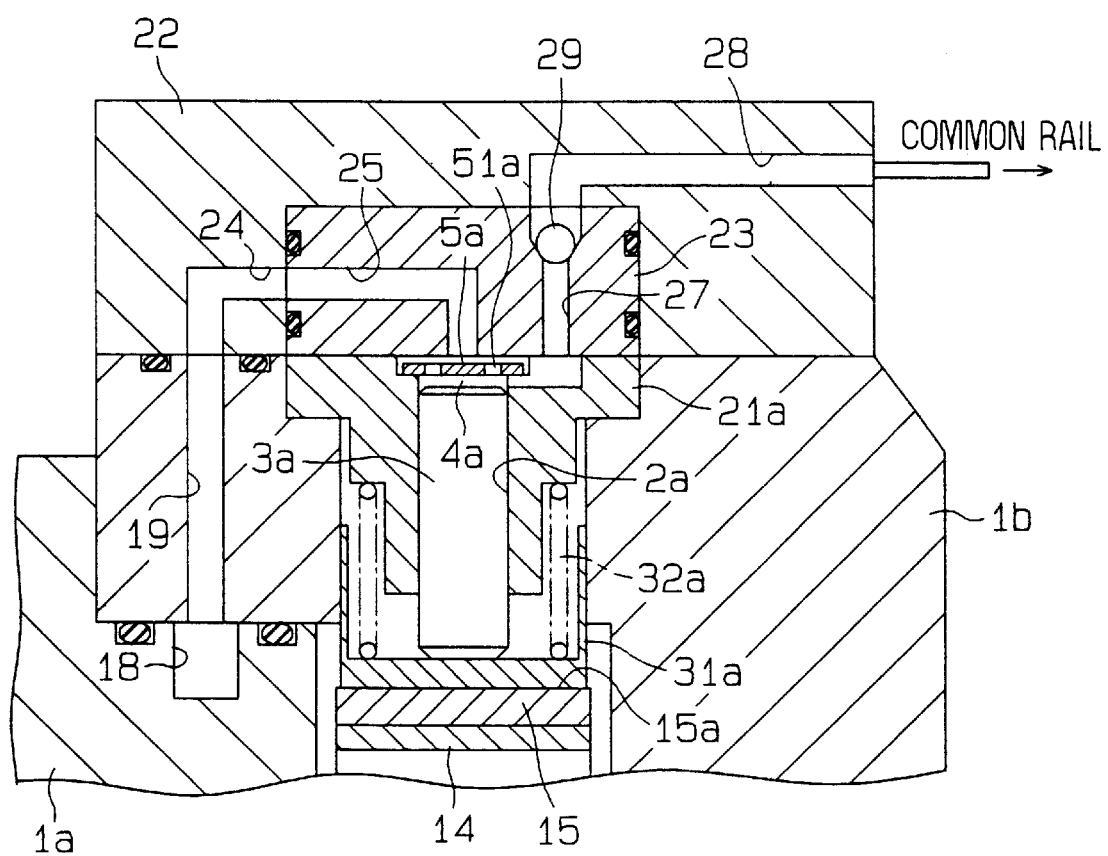
FIG. 3 is an enlarged view of a part of the variable discharge high pressure pump of FIG. 1.

As shown in FIG. 3, the pressure chamber 4a is provided with a plate 5a functioning as a relief valve. The plate 5a has a plurality of through-holes 51a at positions not opposing to the fluid passage 25. Further, high pressure fluid passages 27 and 28 are formed in a cover member 22 and a passage forming member 23. The high pressure fluid passage 27 is provided with a ball 29 acting as are lief valve. A pad 31, which moves slidably within the pump housing 1b, is disposed between the flat surface 15 of the eccentric cam 15 and the plunger 3a. A spring 32 is arranged between the pad 31a and the cylinder body 21. Biasing force of the spring 32 causes the pad 31a to be in contact with the flat surface 15a of the eccentric cam 15. Accordingly, when the eccentric cam 15 is operated with an eccentric motion, the pad 31 makes a reciprocating motion together with the flat surface 15a in upward and downward directions in FIG. 3.

As the flat surface 15a of the eccentric cam 15 moves downward (in FIG. 3) according to the rotation of the drive shaft 10, the biasing force of the spring 32a causes the pad 31 to move downward. At this time, if the electromagnetic valve 30 is in valve opening state, low pressure fuel in the fuel sump 16 flows through the low pressure fluid passages 17 to 19, the fluid passages 24 and 25 and the through-holes 51a to the pressure chamber 4a, thereby causing the plunger 3a to move downward. Fuel flow amount to the pressure chamber 4a is defined by the valve body lift amount (an opening area through which fluid flows) so that, when a given amount of fuel flows into the pressure chamber 4a, the plunger 3a is brought away from the pad 31a. For example, when the valve body lift amount is small, the amount of fuel flowing into the pressure chamber 4a is small so that the downward motion of the plunger 3a stops on a way of the downward motion of the pad 31a.

As the flat surface 15 of the eccentric cam 15 moves upward according to the rotation of the drive shaft 10, the pad 31a moves upward against the biasing force of the spring 32a. After the pad 31a comes in contact with the plunger 3a, pressure of the pressure chamber 4a is increased so that the plate 5a is closely engaged with a lower surface of the passage forming member 23, resulting in interrupting the communication between the fluid passage 25 and the pressure chamber 4a. As the volume of the pressure chamber 4a is reduced, pressure of the pressure chamber 4a increases and, when the pressure reaches a predetermined value and the ball 29 moves to a valve opening position, high pressure fuel in the pressure chamber 4a is supplied via the high pressure fluid passages 27 and 28 to the common rail.

A construction or structure around and related to the pressure chamber 4b or 4c is similar to that around and related to the pressure chamber 4a. That is, a pad 31b or 31c is disposed between the flat surface 15b or 15b and the plunger 3b or 3c and is in contact with the flat surface 15b or 15b due to biasing force of a spring 32b or 32c. The plungers 3a to 3c are provided independently of the pads 31a to 31c so that the biasing forces of the springs 32a to 32c do not act on the plungers 3a to 3c, respectively.

An operation of the electromagnetic valve 30 is described with reference to FIG. 4.

The electromagnetic valve 30 is provided at an inner circumferential surface of a composite valve case 9 with a cylinder (cylindrical hollow) 62 in which a composite valve body 63 formed in a spool shape is slidably housed. The composite valve case 9 is provided with fluid passages 64 and 65 through which the cylinder 62 communicates with the fuel sump 16 shown in FIG. 1. The fluid passage 64 is composed of a slit extending with constant width in an axial direction (left and right directions in FIG. 4) of the composite valve body 63. The slit serves to change the fuel flow path area according to the axial movement of the composite valve body 63 so that the fuel flow amount is accurately regulated.

The composite valve body 63 is provided with a communicating fluid passage 71 axially extending and penetrating through an inside thereof and with fluid passages 66 and 67 through which the communicating fluid passage 71 communicates with an outer circumferential surface of the composite valve body 63. The fluid passage 66 located outside is formed in ring shape so as to communicate with the fluid passage 64 of the composite valve case 9 according to the axial movement of the composite valve body 63. The communicating fluid passage 71 communicates with the fluid passage 66 through a plurality of the fluid passages 67 located inside. An axial end of the communicating fluid passage 71 is opened to a low pressure fluid passage 17 shown in FIG. 1 and the other axial end thereof is opened to a spring chamber 60 in which a spring 69 is accommodated. The composite valve body 63 is opened at both axial ends thereof to minimize fuel pressure acting thereon in the axial direction.

Figure 4:
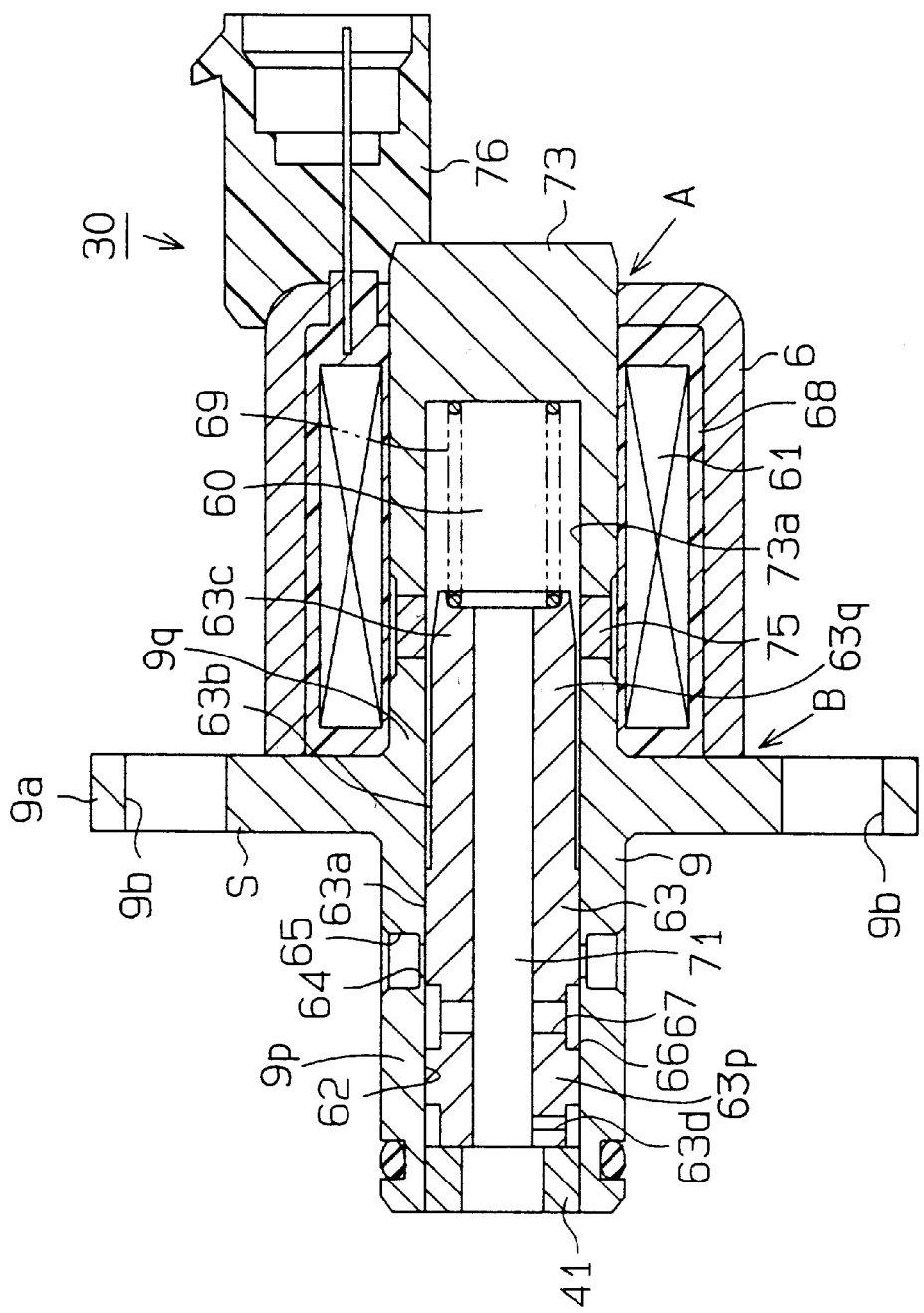
FIG. 4 is an enlarged view of the electromagnetic valve of FIG. 1.

A stopper 41 is press fitted to the composite valve case 9 on left side in FIG. 4. The composite valve body 63 is urged toward the stopper 41 by the spring 69. The stopper 41 serves to define an allowable travel range of the composite valve body 63 in the valve closing state.

The composite valve body 63 is provided at the outer circumferential surface thereof with a sliding portion 63a in sliding contact with an inner wall of the cylinder, a step portion 63b whose diameter is slightly smaller than that of the sliding portion 63a and a taper portion 63c whose diameter is smaller toward an end thereof (right side in FIG. 4). The sliding portion 63a closes and opens an opening of the fluid passage 64 according to the axial movement of the composite valve body 63 in the cylinder 62 so that the electromagnetic valve 30 is operative to open and close the fuel flowpath. The step portion 63b serves to block foreign material from entering into the sliding portion 63 from the taper portion 63c. The step portion 63b maybe omitted so that the sliding portion 63a is directly connected to the taper portion 63c. In this case, preferably, a clearance between the composite valve body 63 and the composite valve case 9 all over the outer circumferential surface thereof except the taper portion 63c is approximately 2 to 4 $\mu$m so that more effective magnetic circuit is formed.

The composite valve body 63 is provided at a left end thereof with a pressure releasing passage 63d that serves to limit a pressure variation adversely affecting thereon.

A stator 73 is connected via an inserting member 75 made of non-magnetic material (for example, austenite based stainless steel SUS 304) to a right end of the composite valve case 9 as shown in FIG. 4. The composite valve case 9, the stator 73 and the inserting member 75 are coaxially bonded to each other and integrated into a body by laser welding. The stator 73 is positioned at a place facing the taper portion 63c of the composite valve body 63.

The composite valve body 63 is urged in the valve closing direction by the spring 69 and, when the coil 61 is not energized, the composite valve body 63 is in contact with the stopper 41 defining the allowable travel range of the composite valve body 63 in the valve closing state. In the valve closing state, the communication between the fuel sump 16 and the low pressure fluid passage 17 is interrupted, as shown in FIG. 1. When the coil 61 is energized, the composite valve body 63 moves against the biasing force of the spring 69 in the valve opening direction so that the fuel sump 16 communicates with the low pressure fluid passage 17. The composite valve body 63 rests at a position where a magnetic force of attracting the composite valve body 63 toward the stator 73 balances with the biasing force of the spring 69 so that an allowable travel range of the composite valve body 63 in the valve opening state is defined. The amount of current to be applied to the coil 61 decides the moving distance of the composite valve body 63 and, as the current increases, the opening area of the fluid passage, that is, the fuel path area increases.

A housing 6 made of magnetic material surrounds an outer surface of the coil 61 and is integrated with the stator 73 by conducting laser welding over an entire circumference of a position indicated with an arrow A in FIG. 4. The coil 61 is housed in a resin bobbin 68. The housing 6 is integrated with the composite valve case 9 by conducting laser welding over an entire circumference of a position indicated with an arrow B in FIG. 4. Each bonding portion is 0.5 mm in depth so that the housing 6, stator 73 and the composite valve case 9 are rigidly fixed to each other to form an integrated body. A resin connector 76 is formed by injection molding on an end side of the electromagnetic valve 30.

The composite valve case 9 is provided with a flange 9a having a through-hole 9b into which a bolt 7 is inserted for fastening the electromagnetic valve 30 to the housing 1b of the variable discharge high pressure pump P, as shown in FIG.

The electromagnetic valve 30 is provided with a seal surface S at a position facing an outer wall of the pump housing 1b (a surface on which the electromagnetic valve 30 is mounted) and perpendicular to an axial direction thereof. When the electromagnetic valve 30 is assembled to the pump housing 1b by putting an o-ring 36 between the pump housing 1b and the seal surface S and pressing the seal surface S toward the pump housing 1b, while disposing an o-ring 35 at an end of the composite valve case 9, as shown in FIG. 1. As a result, the fuel sump 16 is hermetically sealed. Since it is not necessary to position coaxially the o-rings 35 and 36, the electromagnetic valve 30 is easily assembled to the pump housing 1b.

In the conventional electromagnetic valve 120 shown in FIG. 14, a clearance between the electromagnetic valve 120 and a housing (not shown) is sealed by an o-ring 131 disposed at an outer circumference of the valve case 121 and an o-ring 132 disposed at the first stator 126. Positions of the o-rings 131 and 132 are concentric and diameters thereof are different. Therefore, accurate dimensions of the valve 120 and the housing are required to fluid-tightly assemble the valve 120 to the housing. However, the electromagnetic valve 30 according to the first embodiment does not have such a problem as the conventional valve has.

Further, according to the first embodiment, the composite valve body 63 has a valve portion 63p and an armature portion 63q that perform two integrated functions. One is an inherent function as a valve body by which the fluid flow path area is changed based on a sliding movement in the cylinder 62. The other one is a function as an armature which constitutes a magnetic circuit.

The composite valve body 63 is made of soft magnetic material such as pure iron or low carbon steel for achieving the armature function. On the other hand, the composite valve body 63 is required to have higher wear resistance, less frictional force and higher surface hardness to perform sufficiently the inherent valve function. As it is not adequate to conduct a heat treatment such as quenching on soft magnetic material, which adversely affects on magnetic characteristic, a thin hardened layer, whose thickness is about 5 to 15 $\mu$m, is formed on the composite valve body 63 of soft magnetic material by NiP plating (nickel/phosphorous plating). With this thin hardened layer, composite valve body 63 has the surface hardness of Hv 700 to 1100, resulting in improving wear resistance and reducing frictional force without damaging the magnetic characteristic.

Instead of conducting NiP plating, a soft nitride heat treatment may be conducted on the composite valve body 63 so that the thin hardened layer whose depth is 7 to 20 $\mu$m is formed on a surface thereof and a diffusion layer, whose depth is about 0.1 to 0.2 mm, is also formed under the thin hardened layer. In this case, the surface hardness is about Hv 450 to 650.

Further, a ceramic coating such as DLC (Diamond Like Carbon) may be conducted on the valve body. In this case, the coated film thickness is 2 to 4 $\mu$m and the surface hardness is Hv 2000 to 3000 that is very high. The surface treatment or the heat treatment mentioned above is effective for improving the wear resistance and reducing the frictional force without damaging the magnetic characteristic.

According to the first embodiment, the composite valve case 9 has a valve case portion 9p and a stator portion 9q that perform two integrated functions. One is a function as a cylinder in which the valve body is slidably housed. The other one is a function as a part of a stator which constitutes a magnetic circuit.

The composite valve case 9 is made of soft magnetic material such as electromagnetic stainless steel(ferrite based stainless steel SUS 13) for achieving the stator function. On the other hand, the composite valve case 9 is required to have higher wear resistance, less frictional force and higher surface hardness to perform sufficiently the cylinder function. As it is not adequate to conduct a heat treatment such as quenching on soft magnetic material, which adversely affects on magnetic characteristic, a thin hardened layer, whose thickness is about 5 to 15 $\mu$m, is formed on a surface of the composite valve case 9 (cylinder 62) of soft magnetic material by NiP plating. Instead of conducting NiP plating, the soft nitride heat treatment or DLC coating may be conducted on the composite valve case 9. The surface treatment or the heat treatment on the composite valve case 9 is effective for improving the wear resistance and decreasing the frictional force without damaging the magnetic characteristic.

When the thin hardened layer is formed on the composite valve body 63 or the composite valve case 9 by the surface treatment or the heat treatment mentioned above, the thin hardened layer may be formed on an entire surface thereof or only on a sliding surface thereof by masking a portion other than the sliding surface. Accordingly, the composite valve body 63 moves smoothly inside the cylinder 62 of the composite valve case 9.

In the electromagnetic valve 30 mentioned above, the composite valve body 63 constitutes a moving member and the composite valve case 9, the inserting member 75 and the stator 73 constitute a case member. The composite valve body 63 has both the valve and armature functions as one component and the composite valve case 9 has both of the cylinder function and a part of the stator function as one component. Therefore, the electromagnetic valve 30 is composed of the less number of parts, resulting in less manufacturing cost.

Further, the composite valve body 63 and the composite valve case 9 are made of soft magnetic material and has the hardened layer formed by the surface treatment or the heat treatment on the surface thereof. Therefore, while the construction is compact, better fuel flow control (better valve opening and closing operation of the electromagnetic valve 30) can be realized.

Furthermore, even if cavitations occur around a communicating portion between the fluid passages 64 and 66, the hardened layers on the surfaces of the composite valve body 63 and the composite valve case 9 serve to prevent erosions due to the cavitations. More over, even if foreign material enter into a space between the fluid passages 64 and 66, the composite valve body 63 is prevented from deforming because of the hardened layer and, after the foreign material passes through the space, returned to a normal operation state.

As mentioned above, a better construction of the electromagnetic valve 30 serves to adequately regulate fuel discharge amount from the variable discharge high pressure pump P so that control accuracy of common rail pressure is improved.

(Second Embodiment)

A electromagnetic valve 80 according to a second embodiment is described with reference to FIG. 5.

Figure 5:
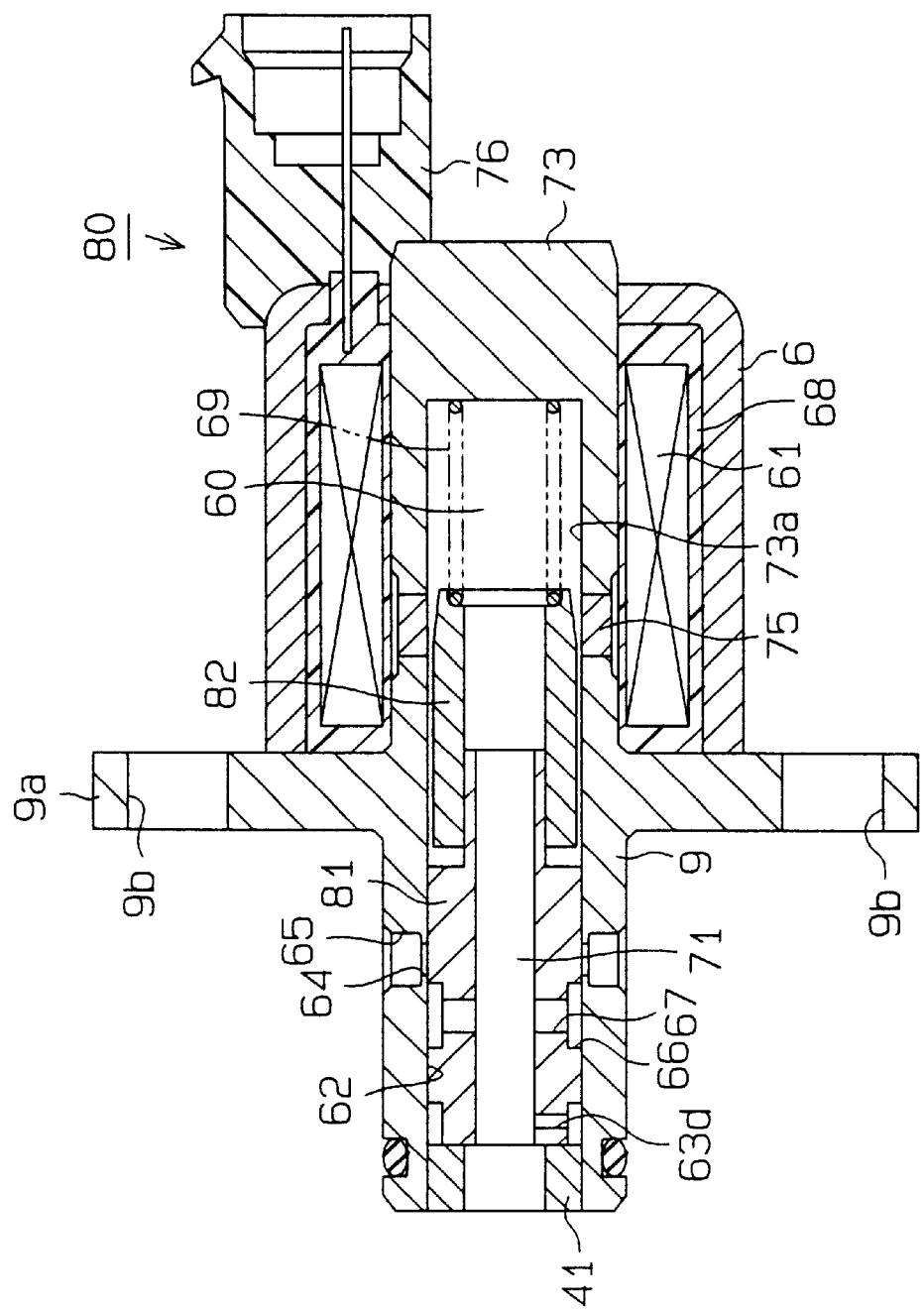
FIG. 5 is a cross sectional view of an electromagnetic valve according to a second embodiment.

According to the electromagnetic valve 80 shown in FIG. 5, a valve body 81 and an armature 82 are formed in advance as separate bodies and, then, assembled into one body to constitute a moving member. An end of the valve body 81 is press fitted to the armature 82. The valve body 81 made of chrome molybdenum steel SCM 415 is treated by carbo-hardning and an outer surface of the valve body 81 is finished by lapping to decrease its friction coefficient. The armature 82 is made of soft magnetic material such as pure iron or low carbon steel. The composite valve case 9 is made of one component having both of the cylinder function and a part of stator function, which is same as that shown in FIG. 4.

The electromagnetic valve 80 according to the second embodiment has the same advantage as mentioned in the first embodiment as far as the composite valve case 9 is concerned since the composite valve case 9 is made of one component and has both the cylinder and stator functions.

(Third Embodiment)

An electromagnetic valve 90 according to a third embodiment is described with reference to FIG. 6.

Figure 6:
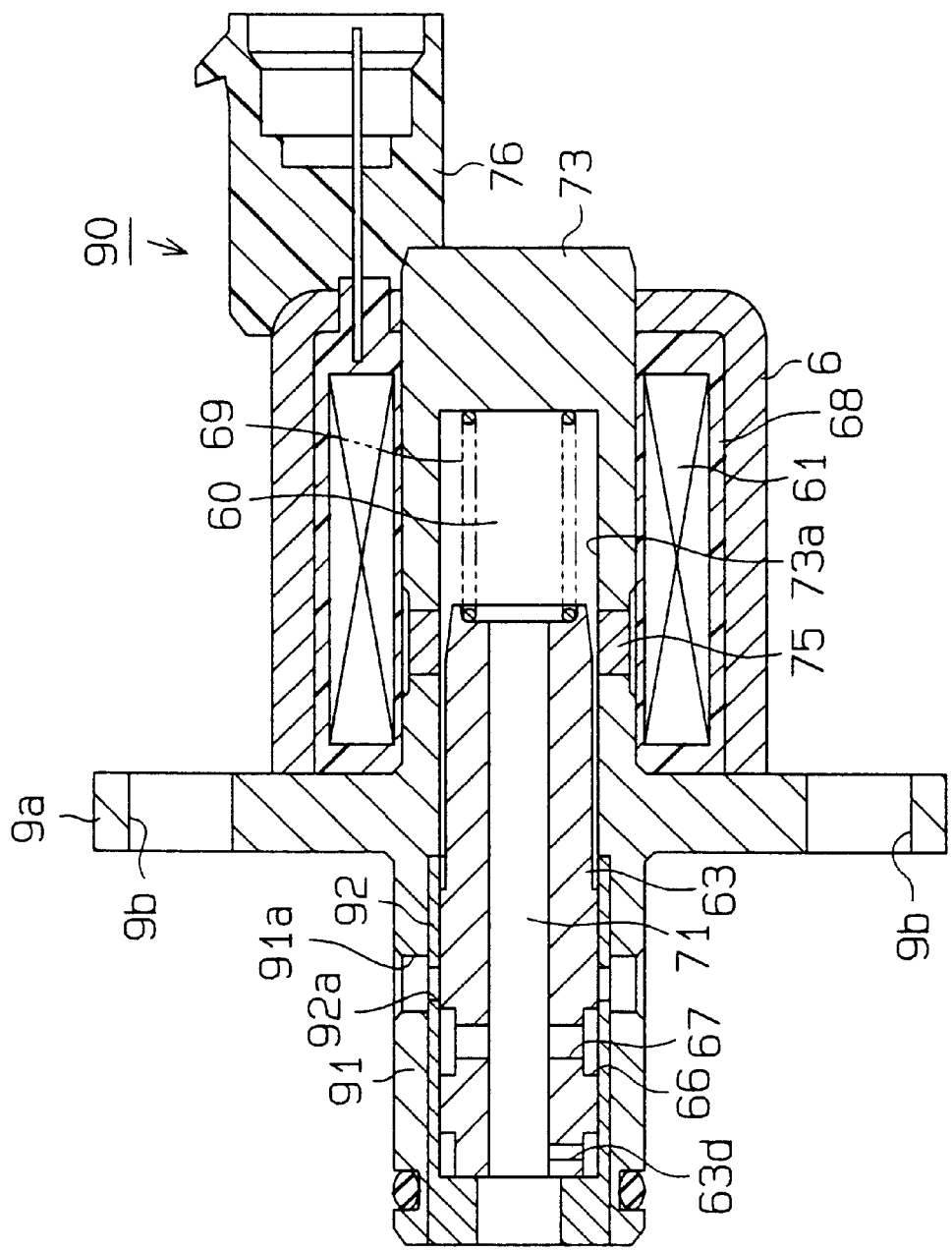
FIG. 6 is a cross sectional view of an electromagnetic valve according to a third embodiment.

According to the electromagnetic valve 90 shown in FIG. 6, a valve case 91 and a cylinder 92 are formed in advance as separate bodies and, then, assembled into one body to constitute a composite valve case. The cylinder 92 is press fitted and fixed to the valve case 91. The composite valve body 63 is slidably housed in the cylinder 92. The cylinder 92 also plays a role as a stopper defining the allowable travel range of the composite valve body 63 in the valve closing state. The stopper maybe provided separately from the cylinder 92. The valve case 91 is provided with a fluid passage 91a communicating with the fuel sump 16 shown in FIG. 1. The cylinder 92 is provided with a fluid passage 92a communicating with the fluid passage 91a. The valve case 91 is made of soft magnetic material such as pure iron or low carbon steel. The cylinder 91 is made of, for example, chrome molybdenum steel SCM 415 which is treated by carbo-hardening. The composite valve body 63 is formed as one component having both of the valve and armature functions, which is same as that shown in FIG. 4.

The electromagnetic valve 90 according to the third embodiment has the same advantage as mentioned in the first embodiment as far as the composite valve body 63 is concerned since the composite valve body 63 is made of one component and has both the valve and armature functions.

(Fourth Embodiment)

An electromagnetic valve 100 according to a fourth embodiment is described with reference to FIG. 7.

Figure 7:
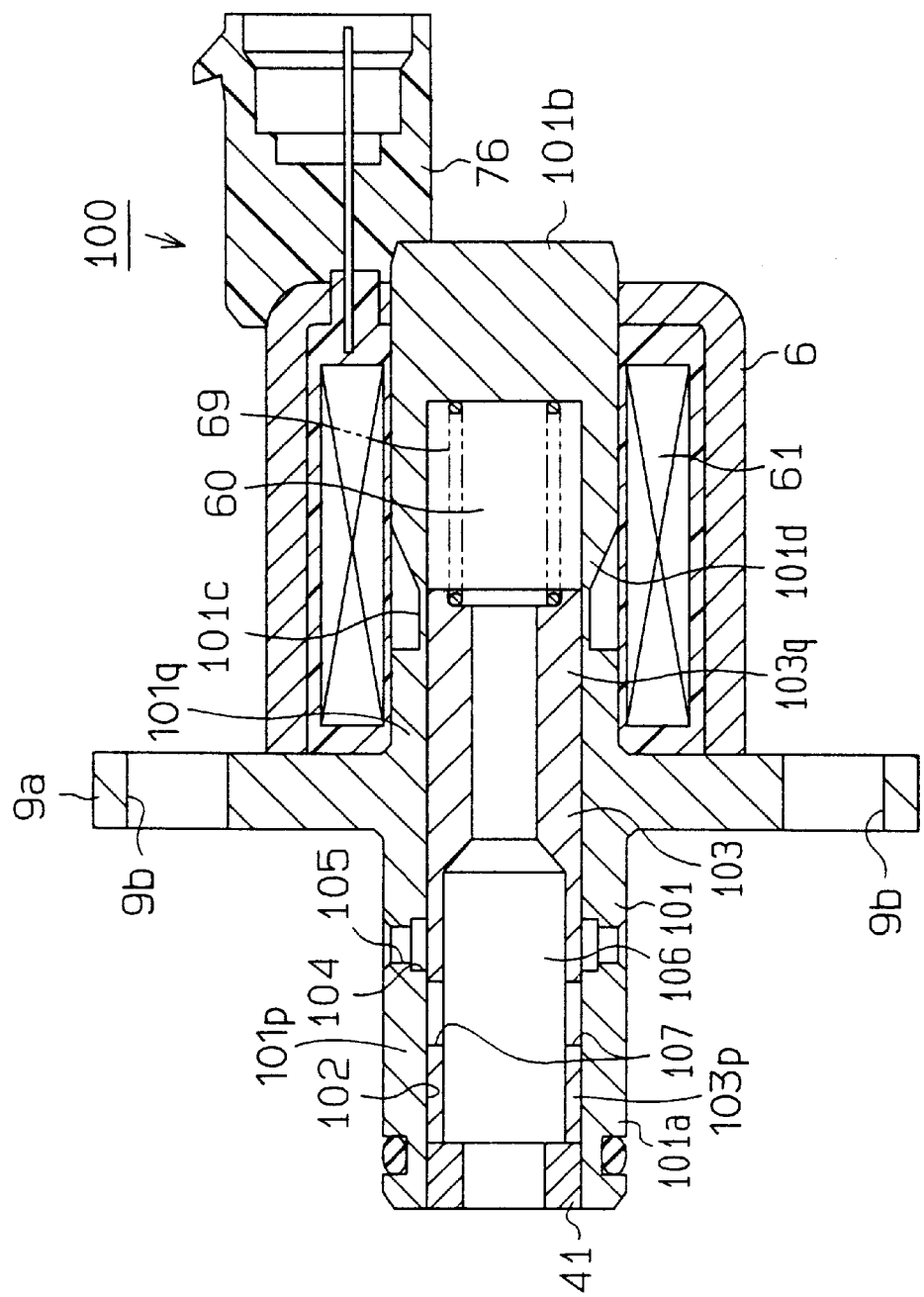
FIG. 7 is a cross sectional view of an electromagnetic valve according to a fourth embodiment.

According to the electromagnetic valve 100 shown in FIG. 7, the composite valve case 9, the inserting member 75 and the stator 73, which are shown in FIG. 4, are integrated to one body and constitute one component.

As shown in FIG. 7, the electromagnetic valve 100 has a composite valve case 101 constituting a case member and a composite valve body 103 constituting a moving member that is slidably housed in a cylinder (cylindrical hollow) 102 provided in the composite valve case 101. A valve accommodating portion 101a (a left side portion including the flange 9a in FIG. 7), in which the composite valve body 103 is housed, has the same construction as the composite valve case 9 shown in FIG. 4. The valve accommodating portion 101a has a valve case portion 101p that perform a cylinder function for slidably accommodating the composite valve body 103 and a stator portion 101q that perform a stator function for constituting the magnetic circuit. The composite valve body 103 has a valve body portion 103p that perform an inherent valve function for changing the fuel path area and an armature portion 103q that perform an armature function for constituting the magnetic circuit, which is the same as the composite valve body 63 shown in FIG. 4.

The composite valve case 101 is provided with fluid passages 104 and 105. The composite valve body 103 is provided with a communicating fluid passage 106 extending axially to penetrate an inside thereof and two fluid passages 107 through which the communicating fluid passage 106 communicate with an outer circumferential surface thereof.

The composite valve case 101 is provided with an armature attracting portion 101b toward which the armature portion 103q of the composite valve body 103 is attracted on energizing the coil. The armature attracting portion 101b is connected via a thin thickness wall 101c to the valve accommodating portion 101a. That is, the valve accommodating portion 101a, the thin thickness wall 101c and the armature attracting portion 101b are integrally formed into one body as the composite valve case 101. The thin thickness wall 101c has a taper portion 101d whose outer diameter is smaller toward the composite valve body 103 (the armature portion 103q).

When the coil 61 is energized, magnetic flux passing through the composite valve case 101 is throttled and restricted by the thin thickness wall 101c and while by passing thin thickness wall 101c, mainly passes through the armature portion 103q of the composite valve body 103 to the armature attracting portion 101b. Therefore, the composite valve body 103 (the armature portion 103q) is attracted toward the attracting portion 103b 107 and the composite valve body 103 moves to a given position against the biasing force of the spring 69. Thus, fluid passages 104 and 105 communicate with the fluid passages 107 so that fuel flows by an amount responsive to areas of the fluid passages 107 opened to the fluid passage 104.

If the thin thickness wall 101c is too thin, a strength problem occurs. To the contrary, if the thin thickness wall 101c is too thick, magnetic flux passes too much through the thin thickness wall 101c so that performance of the electromagnetic valve is damaged. The thickness of the thin thickness wall 101c has to be defined in consideration of the strength and the performance and, in this embodiment, for example, 0.3 to 0.7 mm is preferable.

Instead of the taper portion 63c at the axial end of the composite valve body 63 in the electromagnetic valve 30 shown in FIG. 4, the taper portion 101d is provided in the composite valve case 101 according to the fourth embodiment. In the construction shown in FIG. 4, it is difficult to provide the taper portion in the stator 75 since the stator 73 is welded to the inserting member 75. However, the case member according to the fourth embodiment makes it possible to provide the taper portion 101d to improve the magnetic characteristic of the electromagnetic valve 100.

The composite valve case 101 is made of soft magnetic material such as electromagnetic stainless steel (ferrite based stainless steel SUS 13), which is the same as the composite valve case 9 shown in FIG. 4, or low carbon steel (S 10C).

Though the electromagnetic stainless steel is preferable in the construction shown in FIG. 4 in view of the welding to the inserting member 75, the low carbon steel (S 10C), which has higher maximum magnetic flux density than that of the electromagnetic stainless steel, may be used in the construction shown in FIG. 7.

The composite valve case 101 is provided at a surface thereof with a thin hardened layer formed by the surface treatment (NiP plating or DLC) or the heat treatment (soft nitride hardening). It is preferable that the thin hardened layer is provided only at the sliding surface of the cylinder 102. Further, the thin hardened layer formed by the soft nitride hardening is more preferable, since the diffusion layer is also formed by the soft nitride hardening. Accordingly, the magnetic flux passing through the thin thickness wall portion 101c is further limited by the thin hardened layer and the diffusion layer through which less magnetic flux passes.

The composite valve body 103 is made of soft magnetic material such as pure steel or low carbon steel, which is the same as the composite valve body 63 shown in FIG. 4. The surface of the composite valve body 103 has a thin hardened layer formed by the surface treatment (NiP plating or DLC) or the heat treatment (soft nitride hardening).

Figure 8:
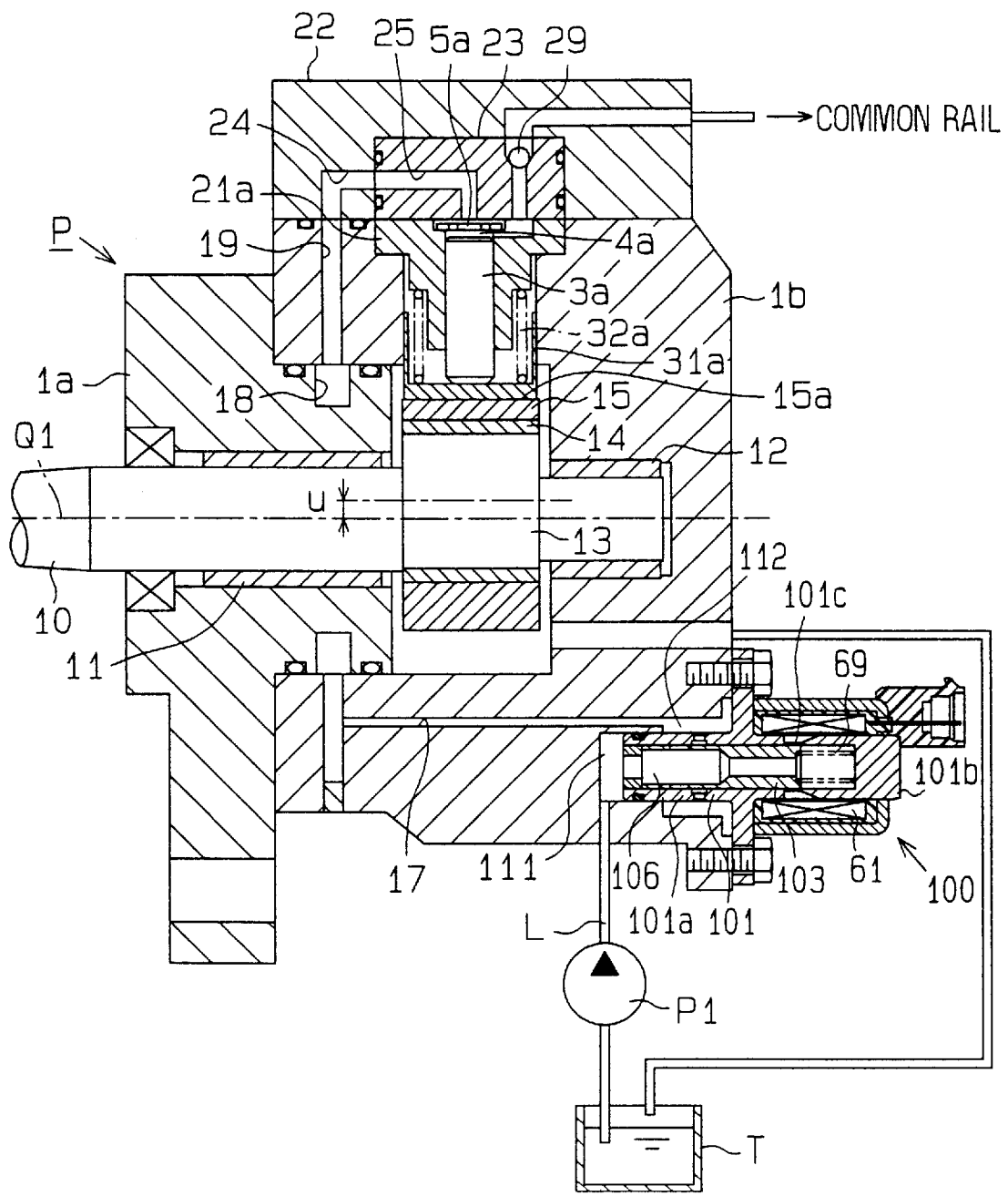
FIG. 8 is a cross sectional view of a variable discharge high pressure pump to which the electromagnetic valve of FIG. 7 is applied.

As shown in FIG. 8, the electromagnetic valve is assembled to the pump housing 1b. Fuel in the fuel tank T pressurized by the feed pump P1 is fed to a fluid passage 111 via a low pressure fluid passage L. Fuel of the fluid passage 111 flows into the communicating fluid passage 106 of the composite valve body 103 and, then, flows to the low pressure fluid passage 17 via the fluid passages 104, 105 and 107 of the composite valve body 103 and the composite valve case 101 and a fluid passage 112. That is, an axial end of the communicating fluid passage 106 constitutes an inlet and the fluid passage 105 constitutes an outlet. In this case, fuel pressure variation based on the pressure chamber 4, in which fuel is sucked and compressed, is transmitted to the fluid passages 104 and 105. That is, when the plunger 3a moves upward, the plate 5a is closely engaged with the lower surface of the passage forming member 23 since pressure of the pressure chamber 4a becomes high. In a high speed operation of the engine, a pulsated pressure wave (pressure variation), whose maximum pressure is about 6 Mpa, is produced. The pulsated pressure wave is transmitted to the electromagnetic valve 100 via the fluid passage 24 and the low pressure fluid passages 19, 18, 17 and 112. Even if the electromagnetic valve 100 is in valve opening state, the area of the fluid passage of the composite valve body 103 opened to the fluid passage of the composite valve case 101 serves as a throttle for easing the pulsated pressure wave so that alleviated pulsated pressure wave is transmitted to the communicating fluid passage 106 and, then, to the spring chamber 60. As the alleviated pulsated pressure wave acts on the thin thickness wall 101c of the composite valve case 101, the thin thickness wall 101 is prevented from a damage that might be caused by the pulsated pressure wave, if directly applied thereto.

According to the electromagnetic valve 100, the composite valve body 103, which is one component, has both of the valve function and the armature function and, further, the composite valve case 101, which is one component, has both of the cylinder function and the stator function, resulting in less number of components as a total and less manufacturing cost. Further, as the composite valve case 101 has the valve accommodating portion 101a, the thin thickness wall 103c and the armature attracting portion 101b, which are formed into one component, the electromagnetic valve 100 can be manufactured with much less number of components, compared with the electromagnetic valve 30, 80 or 90 according to the first, second or third embodiment. According to the composite valve case 101, the first and second stators of the conventional electromagnetic valve 120 shown in FIG. 14 are integrated into one body.

In an electromagnetic valve in which higher wear resistance and lower frictional force are not required, the thin hardened layer at the surface of the moving member or the case member may not be provided.

(Fifth Embodiment)

Figure 9:
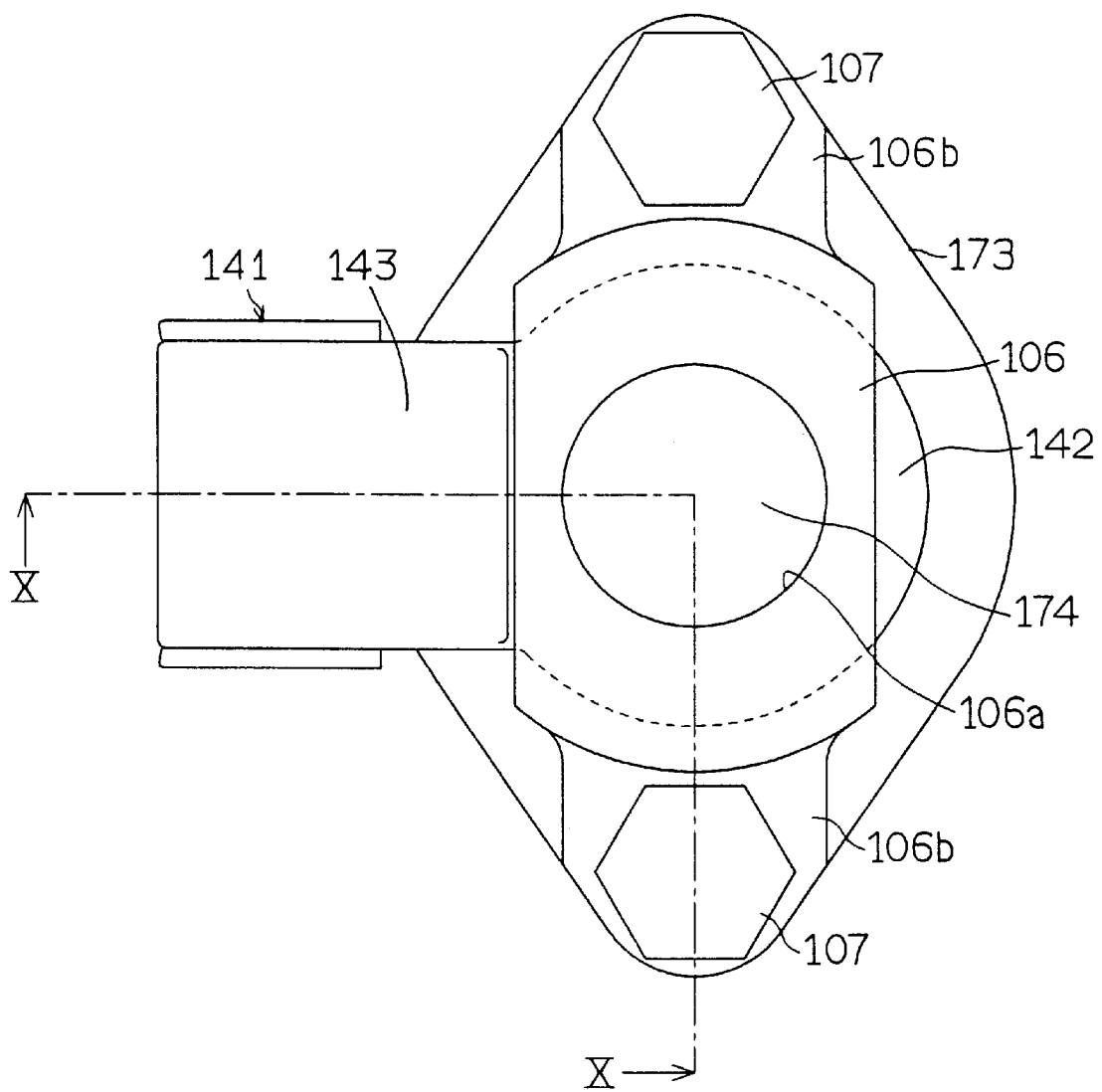
FIG. 9 is a side view of an electromagnetic valve according to a fifth embodiment.

An electromagnetic valve 130 according to a fifth embodiment is described with reference to FIGS. 9 and 10.

According to the fifth embodiment, the electromagnetic valve 130 is assembled to the pump housing 1c shown in FIG. 1 instead of the electromagnetic valve 30.

Figure 10:
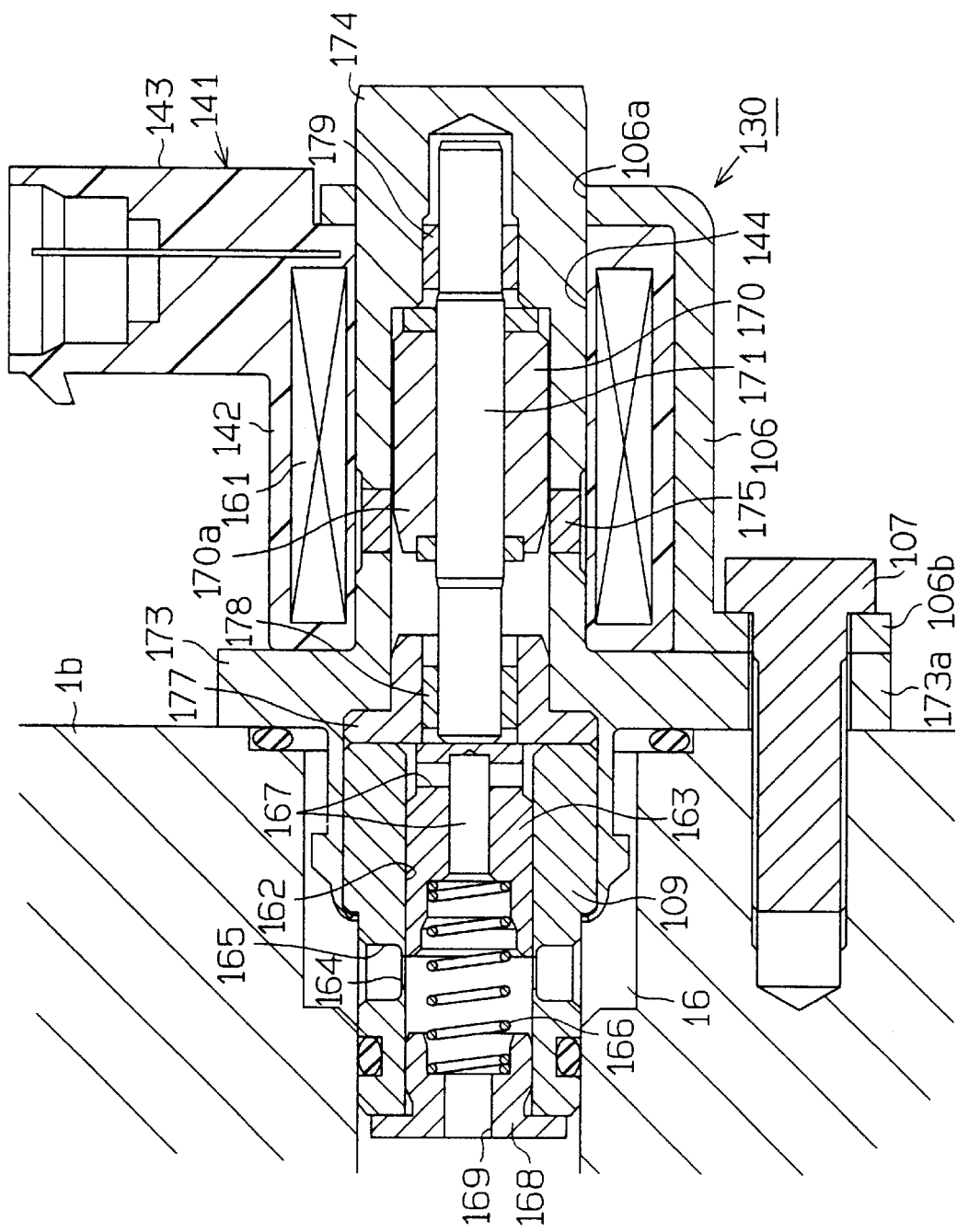
FIG. 10 is a cross sectional view taken along a line X—X of FIG. 1.

As shown in FIG. 10, the electromagnetic valve 130 is provided at an inner circumferential surface of a valve case 109 with a cylinder 162 in which a valve body 163 formed in a spool shape is slidably housed. The valve case 109 is provided with fluid passages 164 and 165 through which the cylinder 162 communicates with the fuel sump 16 provided in the pump housing 1b. The fluid passage 164 is composed of a slit extending with constant width in an axial direction (left and right directions in FIG. 10) of the valve body 163. The slit serves to change the fuel flow path area according to the axial movement of the valve body 163 so that the fuel flow amount is accurately regulated.

A spring guide 168 is press fitted to the valve case 109. The spring guide 168 is provided with a fluid passage 169 that communicates with the low pressure fluid passage 17 shown in FIG. 1. A spring 166 is disposed between the spring guide 168 and the valve body 163. The valve body 163 is always urged in a valve opening direction (right direction in FIG. 10) by a biasing force of the spring 166. The valve body 163 is provided with fluid passage 167.

A first stator 73 surrounds an outer circumference of the valve case 109. A second stator 174 is connected via an inserting member 175 made of non-magnetic material (for example, austenite based stainless steel SUS 304) to the first stator 173. The first and second stators 173 and 174 and the inserting member 175 are coaxially bonded to each other and integrated into a body by laser welding.

A bush 177 is press fitted to the first stator 173. A sleeve bearing 178 is positioned inside the bush 177. Another sleeve bearing 179 is positioned inside the second stator 174. A bush rod 171, which is integrated with an armature 170, is supported so as to axially move by the sleeve bearings 178 and 179. An axial end of the bush rod 171 is in contact with an axial end of the valve body 163 opposing thereto. That is, the valve body 163 and the bush rod 171 are formed as separate components and positioned near coaxially. Each of the sleeve bearings 178 and 179, whose shapes are identical, is provided with a plurality of grooves (not shown) extending axially so that fuel pressures in respective spaces are balanced.

The first stator 173 is provided with flanges 173a having holes through which bolts 107 is inserted for fixing the electromagnetic valve 130 to the pump housing 1c.

Each of the first and second stator 173 and 174 is made of soft magnetic material such as electromagnetic stainless steel (ferrite based stainless steel SUS 13). The armature 170 is made of soft magnetic material such as permalloy. In a case that the electromagnetic valve 130 is installed laterally (longitudinal direction of the valve body 163 is horizontal) in the pump housing 1b, unequal force based on a weight of the armature 170 is not applied to the valve body 163, since the valve body 163 and the bush rod 171 are formed as the separate bodies. However, the valve body 163 and the bush rod 171 may be formed into one body in view of reducing a number of components.

The armature 170 is provided at an axial end with a taper portion 170a whose cross sectional area is smaller toward the first stator 173. A displacement position (shift amount) of the valve body 163 is decided by an amount of current applied to a coil 161. When the coil 61 is energized, the bush rod 171 moves in left direction in FIG. 10 to push the valve body 163. Accordingly, the valve body 163 shifts against the biasing force of the spring 166. AS the amount of current increases, the lift amount of the valve body 163 increases and an area of communication between the fluid passages decreases.

With the electromagnetic valve 130 mentioned above, when the coil 161 is not energized, the valve body 163 is urged by the biasing force of the spring 166 in right direction in FIG. 10 until a right end of the valve body is brought into contact with and stopped by the bush 77, which defines the allowable travel range of the valve body 163 in the valve opening state. When the coil 161 is energized, the valve body 163 moves against the biasing force of the spring 166 in the valve closing direction and rests at a position where a magnetic force of attracting the valve body 163 toward the first stator 173 balances with the biasing force of the spring 166 so that an allowable travel range of the valve body 163 in the valve opening state is defined.

The valve case 109 and the first and second stators 173 and 174 constitute the case member and the valve body 163, the bush rod 171 and the armature 170 constitute the valve member. An assembly of the case member and the valve member constitutes a valve mechanism R, as shown in FIG. 11.

A solenoid 141 is composed of a bobbin 142, in which the coil 61 is accommodated, and a connector 43 for inputting and outputting electric signals. The bobbin 142 is formed in cylindrical shape so as to surround an outer surface of the second stator 174. The connector 143 extends in a direction perpendicular to an axis of the bobbin 142.

A housing 106 has a hole 106a into which the second stator is inserted and is positioned outside the bobbin 142 so as to surround the bobbin 142. The housing 106 is provided, as clearly shown in FIG. 9, with two flanges 106b having holes into each of which the bolt 107 is inserted for fastening the first stator 173 and the housing 106. The housing 106 is made of soft magnetic material such as electromagnetic stainless steel (ferrite bases stainless steel SUS 13) and constitutes a magnetic circuit together with the valve mechanism R.

Figure 11:
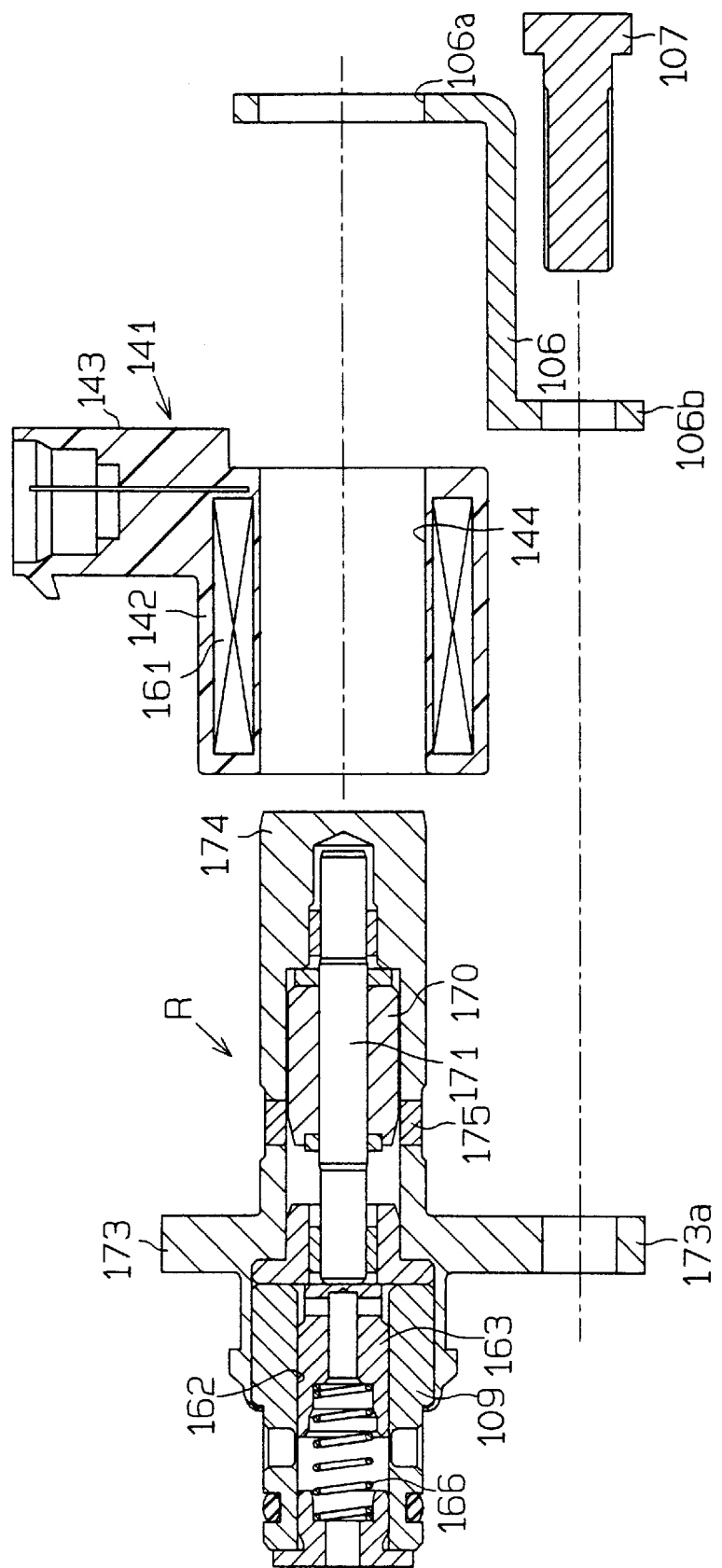
FIG. 11 is an exploded view of the electromagnetic valve of FIG. 10.

As shown in FIG. 11, the valve mechanism R and the solenoid 41 are separately formed and assembled to each other in such a manner that the second stator 174 is inserted into a hollow 144 of the solenoid 141. Then, the housing 106 is assembled and fastened by the bolts 107 to the valve mechanism R and the pump housing 1b in a state that the solenoid 141 is put between the first stator 173 and the housing 106. Accordingly, the electromagnetic valve 130 is rigidly fixed to the pump housing 1b.

Manufacturing processes of the solenoid 41 are described with reference to FIGS. 12A to 12C. FIG. 12A shows the bobbin 142 before a coil winding process. The bobbin 142 is formed in cylindrical shape by resin injection molding and provided at axial opposite ends thereof with flange portions 142a extending out ward along an outer circumference thereof. Space between the flange portions 142a forms a place where the coil 161 is accommodated. Each of the flange portions 142 is provided on an outer side surface thereof with an annular projection 145 or 146 whose cross sectional shape is trapezoidal.

Then, terminals 147 are inserted into holes 142b provided in one of the flange portions 142a and, after the coil 161 is wound in the space between the flange portions 142a, ends of the coil 161 are connected to the terminals 147, as shown in FIG. 12B.

Further, as shown in FIG. 12C, an outer circumferential surface of the coil 161, both axial end surfaces of the bobbin 42 and a part of the terminals 147 are covered with resin by second injection molding so that the connector 143 is formed and the solenoid 141 is completed. When the second injection molding is conducted on the bobbin 142, a part of the bobbin 142 such as the annular projections 145 and 146 is once melted and, then, solidified together with resin provided newly by the second injection molding. Accordingly, the bobbin 142 and the connector 143 are rigidly integrated without a clear resin boundary between the first and second injection molding. It is preferable that the annular projection 145 or 146 protrudes outward and the cross sectional area thereof is relatively small for easy melting and solidification of resin by the first and second injection moldings. The cross sectional shape of the annular projection 145 or 146 may be triangle or circular.

According to the electromagnetic valve 130, the valve mechanism R made of metal material, the solenoid 41 mainly made of resin and the housing 106 made of metal material are separately provided and, after assembling them, are fixed to each other by the bolts 107. Accordingly, it is very easy to separate the solenoid 41 from the valve mechanism R and the housing, resulting in easy classified collection or recycling of waste material, for example, when the vehicle is scraped.

Further, as the outer circumference of the coil 161 including spaces between the bobbin 142 and the coil 161 are completely covered with resin by the second injection molding so that not only the coil 161 is not exposed directly to water such as salty seawater but also moisture or water is prevented from entering into an inside of the coil 161. That is, the second injection molding serves not only form the connector 143 but also to protect the coil 161 without using separate sealing material.

Instead of fastening the housing 106 to the valve mechanism R with the bolts 107 inserted into the holes of the flanges 173a and 106b, the housing 106 maybe fixed to the valve mechanism R in such a manner that, after putting the solenoid 141 between the valve mechanism R and the housing 106, a ring shaped clip 181 is fitted into a ring shaped groove 174a provided on a side surface of the second stator 174 near an axial end thereof, as shown in FIGS. 13A and 13B. If the clip 181 is removed from the groove 174a, the solenoid 141 is easily separated from the valve mechanism R and the housing 106. Therefore, this construction is preferable in view of the easy classified collection or recycling of waste material.

Further, the housing 106 may be fixed to the first stator 174 (the valve mechanism R) or the pump housing 1b by using any detachable fixing member other than the bolts 107 or the clip 181.

Furthermore, instead of integrating the bobbin 142 and the connector 143 into the solenoid 141 by the first and second injection molding, the bobbin 142 and the connector 143 may be formed as separate bodies and, after the bobbin 142 and the connector 143 are sandwiched between the valve mechanism R and the housing 106, the housing 106 may be fixed to the valve mechanism R by the fixing member such as the bolt.

Instead of the normally closed electromagnetic valve that is in valve closing state when the coil is not energized, the electromagnetic valve may be a normally open valve or a valve in which a fluid path area is slightly opened when the coil is not energized. For example, the electromagnetic valve 30 or 130 shown in FIG. 4 or 10 may be modified in such a manner that the fluid passage 64 or 164 is slightly opened to the fluid passage 66 or 169 and the fluid path area increases as the amount of current applied to the coil increases.

Instead of the linear solenoid valve (proportional electromagnetic valve), the electromagnetic valve may be an on-off valve in which a valve body moves between predetermined valve opening and closing positions.

Instead of applying the electromagnetic valve to the variable discharge high pressure pump, the electromagnetic valve may be used as a fuel injection valve or may be applied to any fluid flow control device such as a brake device having ABS (anti-lock braking system) or a hydraulic control device for controlling operation oil.

What is claimed is:

1. An electromagnetic valve to be fixed to a base housing for controlling fluid flow in housing fluid passages provided in the base housing, comprising:

a case member having a stator and a valve case, the case member being provided inside with a cylindrical hollow extending from the valve case to the stator;

a coil member arranged around the case member on a side of the stator; and a cylindrical moving member having an armature and a valve body, the moving member being housed in the cylindrical hollow so that the valve body is in slidable contact with the valve case for controlling the fluid flow and being moved axially when the coil member is energized to generate magnetic flux passing through the stator and the armature, wherein the case member and the cylindrical moving member are characterized by at least one of a feature that the valve case and at least a part of the stator are integrally formed into one body to constitute a composite valve case and a feature that the valve body and the armature are integrally formed into one body to constitute a composite valve body, wherein the stator comprises a first stator, a magnetic flux restricting element and a second stator which are arranged in series in an axial direction of the case member so that the magnetic flux mainly passes from the first stator via the armature to the second stator, while bypassing the magnetic flux restricting element, and wherein the magnetic flux restricting element is a thin integral wall portion of the case member whose wall thickness is thinner than that of any of the first and second stators through which magnetic flux passes.

2. An electromagnetic valve according to claim 1 wherein the valve case and the valve body are provided with inner fluid passages whose inlet is connectable to one of the housing fluid passages and whose outlet is connectable to the other of the housing fluid passages and, when the cylindrical moving member moves in the cylindrical hollow relatively to the case member, an amount of the fluid flowing through the inner fluid passages is changed.

3. An electromagnetic valve according to claim 1 wherein at least one of the composite valve case and the composite valve body is made of soft magnetic material and is provided at a surface thereof with a hardened layer formed by at least one of a surface treatment and a heat treatment.

4. An electromagnetic valve according to claim 3, wherein the hardened layer is provided at least at one of a surface of the valve case and a surface of the valve body which are in sliding contact with each other.

5. An electromagnetic valve according to claim 1, wherein the valve case, the first and second stator and the magnetic flux restricting element are integrally formed into one body so that the case member constitutes a single body.

6. An electromagnetic valve according to claim 5, wherein the case member is made of soft magnetic material and is provided at a surface thereof with a hardened layer formed by at least one of a surface treatment and a heat treatment.

7. An electromagnetic valve according to claim 6, wherein the hardened layer is a layer, whose depth is several $\mu$m, formed by soft nitride heat treatment.

8. An electromagnetic valve according to claim 1, wherein the thin wall portion has a tapered outer surface whose diameter is smaller toward the armature.

9. An electromagnetic valve according to claim 1, wherein the inner fluid passage of the valve case comprises a case fluid passage through which an outer wall side of the case member communicate with an inner wall side thereof and the inner fluid passage of the valve body comprises a penetrating passage extending from an axial end of the moving valve body comprises a penetrating passage extending from an axial end of the moving member from another axial end thereof and a bridging passage to allow a communication between the penetrating passage and the case fluid passage according to a displacement of the moving member relative to the case member, and, further, wherein an opening of the case fluid passage on the outer wall side of the case member is connectable to one of the housing fluid passages and an opening of the penetrating passage on the axial end side of the moving member is connectable to the other of the housing fluid passages.

10. A high pressure pump having the electromagnetic valve recited in claim 1, comprising:

a pump housing constituting the base housing;

a driving shaft rotating in the pump housing;

a plunger accommodated in the pump housing and driven to make a reciprocating motion by the driving shaft;

a pressure chamber provided between an inner wall of the pump housing; and fluid passages, which are provided in the pump housing, having a low pressure passage and a high pressure passage, the low pressure passage connecting the pressure chamber to the electromagnetic valve and the high pressure passage connecting the pressure chamber to outside so that fluid supplied from the electromagnetic valve through the low pressure passage to the pressure chamber is pressurized and discharged through the high pressure passage to outside by the reciprocating motion of the plunger.

11. An electromagnetic valve to be fixed to a base housing for controlling fluid flow in housing fluid passages provided in the base housing, comprising:

a case member having a stator and a valve case, the case member being provided inside with a cylindrical hollow extending from the valve case to the stator;

a coil member arranged around the case member on a side of the stator; and a cylindrical moving member having an armature and a valve body, the moving member being housed in the cylindrical hollow so that the valve body is in slidable contact with the valve case for controlling the fluid flow and being moved axially when the coil member is energized to generate magnetic flux passing through the stator and the armature, wherein the case member and the cylindrical moving member are characterized by at least one of a feature that the valve case and at least a part of the stator are integrally formed into one body to constitute a composite valve case and a feature that the valve body and the armature are integrally formed into one body to constitute a composite valve body, and wherein the case member is provided with a flange surface extending outward perpendicularly to an axis thereof and, when the electromagnetic valve is fixed to the base housing, a clearance between the flange surface and an outer wall surface of the base housing is fluid-tightly sealed.

12. An electromagnetic valve to be fixed to a base housing for controlling fluid flow in housing fluid passages provided in the base housing, comprising:

a case member having a stator and a valve case, the case member being provided inside with a cylindrical hollow extending from the valve case to the stator;

a coil member arranged around the case member on a side of the stator; and a cylindrical moving member having an armature and a valve body, the moving member being housed in the cylindrical hollow so that the valve body is in slidable contact with the valve case for controlling the fluid flow and being moved axially when the coil member is energized to generate magnetic flux passing through the stator and the armature, wherein the case member and the cylindrical moving member are characterized by at least one of a feature that the valve case and at least a part of the stator are integrally formed into one body to constitute a composite valve case and a feature that the valve body and the armature are integrally formed into one body to constitute a composite valve body, and wherein the case member is provided outside with a flange surface extending outward perpendicularly to an axis thereof and the coil member is urged toward and fixed to the flange surface.

13. An electromagnetic valve according to claim 12, wherein the coil member comprises a solenoid having a center hole into which the case member on a side of the stator is inserted, a housing disposed outside the solenoid and a detachable fixing member by which the solenoid and the housing is urged toward and fixed to the flange surface in a state that the solenoid is sandwiched between the flange surface and the housing.

14. An electromagnetic valve according to claim 13, wherein, when the electromagnetic valve is fixed to the base housing, the flange surface together with the solenoid and the housing is fixed to the base housing by the fixing member.

15. An electromagnetic valve to be fixed to a base housing for controlling fluid flow in housing fluid passages provided in the base housing, comprising:

a case member having a stator and a valve case which are integrally formed into one body to constitute a composite valve case, the case member having a cylindrical hollow extending from the valve case to the stator;

a coil member disposed around the case member near the stator; and a cylindrical moving member having an armature and a valve body which are integrally formed into one body, the moving member being disposed in the cylindrical hollow so that the valve body can move in the valve case when the coil member is energized to generate magnetic flux passing through the stator and the armature, wherein the stator comprises a first stator, a magnetic flux restricting element and a second stator integrally formed in the case member so that the magnetic flux mainly passes from the first stator via the armature of the moving member to the second stator, while bypassing the magnetic flux restricting element.

16. An electormagnetic valve according to claim 15, wherein the magnetic flux restricting element is a thin integral wall portion of the case member whose wall thickness is thinner than that of any of the first and second stators.

* * * * *